US008837300B2

(12) United States Patent
Nedeltchev et al.

(10) Patent No.: US 8,837,300 B2
(45) Date of Patent: Sep. 16, 2014

(54) MANAGING TRACE REQUESTS OVER TUNNELED LINKS

(75) Inventors: Plamen Nedeltchev, San Jose, CA (US); Aamer Akhter, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 151 days.

(21) Appl. No.: 13/488,921

(22) Filed: Jun. 5, 2012

(65) Prior Publication Data

US 2013/0322258 A1    Dec. 5, 2013

(51) Int. Cl.
- *H04L 1/14* (2006.01)
- *H04L 12/701* (2013.01)
- *H04L 12/70* (2013.01)
- *H04L 12/26* (2006.01)

(52) U.S. Cl.
CPC ............... *H04L 45/00* (2013.01); *H04L 47/00* (2013.01); *H04L 43/00* (2013.01)
USPC ........................... 370/241; 370/392; 370/400

(58) Field of Classification Search
CPC ......... H04L 43/08; H04L 43/50; H04L 45/00; H04L 47/00
USPC ............. 370/241, 241.1, 244–245, 248–249, 370/252, 353–356, 389, 392, 400–401, 370/428–429
See application file for complete search history.

(56) References Cited

U.S. PATENT DOCUMENTS

| | | | |
|---|---|---|---|
| 6,990,086 B1 * | 1/2006 | Holur et al. | 370/329 |
| 7,305,492 B2 * | 12/2007 | Bryers et al. | 709/249 |
| 7,660,254 B2 | 2/2010 | Vasseur et al. | |
| 7,693,055 B2 | 4/2010 | Vasseur et al. | |
| 7,746,796 B2 | 6/2010 | Swallow et al. | |
| 7,765,294 B2 * | 7/2010 | Edwards et al. | 709/224 |
| 7,920,466 B2 | 4/2011 | Vasseur | |
| 8,085,674 B2 * | 12/2011 | Damm et al. | 370/241.1 |
| 8,111,627 B2 | 2/2012 | McCallum et al. | |
| 8,125,897 B2 * | 2/2012 | Ray et al. | 370/229 |
| 8,199,658 B2 | 6/2012 | Vasseur et al. | |
| 8,279,749 B2 | 10/2012 | Vasseur et al. | |

(Continued)

FOREIGN PATENT DOCUMENTS

EP     2530892 A1    12/2012

OTHER PUBLICATIONS

Donnet, et al., "Revealing MPLS Tunnels Obscured from Traceroute", Computer Communication Review, vol. 42 No. 2, Apr. 2012, pp. 88-93, ACM SIGCOMM.

(Continued)

*Primary Examiner* — Kevin Mew
(74) *Attorney, Agent, or Firm* — Edwards Wildman Palmer LLP; James M. Behmke; Stephen D. LeBarron

(57) ABSTRACT

In one embodiment, a head-end node of a tunnel, relative to a tail-end node, receives a trace request, and in response, generates an out-of-tunnel trace request based on the trace-request. The trace request is transmitted in-tunnel to the tail-end node, while also transmitting the out-of-tunnel trace request to at least one subsequent node. The head-end node may then receive a trace response from the tail-end node based on the in-tunnel trace request, as well as a trace response from each of the subsequent nodes based on the out-of-tunnel trace request.

20 Claims, 7 Drawing Sheets

(56) References Cited

U.S. PATENT DOCUMENTS

| | | | |
|---|---|---|---|
| 8,351,329 B2* | 1/2013 | Pignataro et al. | 370/230 |
| 8,369,213 B2 | 2/2013 | Vasseur et al. | |
| 8,374,095 B2* | 2/2013 | Boutros et al. | 370/248 |
| 2008/0080507 A1 | 4/2008 | Swallow et al. | |
| 2009/0225652 A1 | 9/2009 | Vasseur et al. | |
| 2010/0118711 A1* | 5/2010 | Cankaya et al. | 370/248 |
| 2011/0317696 A1 | 12/2011 | Aldrin et al. | |
| 2012/0063314 A1* | 3/2012 | Pignataro et al. | 370/392 |

OTHER PUBLICATIONS

Finnie, et al., "Notification of Transmittal of the International Search Report and the Written Opinion of the International Searching Authority, of the Declaration", Patent Cooperation Treaty, International Application No. PCT/US2013/044237, mailed Oct. 22, 2013, 12 pages, European Patent Office, Rijswijk, Netherlands.

Akhter, A., "User Traffic Analysis by Medianet Performance Monitor", http://blogs.cisco.com, Cisco Blog, Borderless Networks, Feb. 2011, 3 pages.

Akhter, A., "Mediatrace: A Better Traceroute that Does the Walking for You", http://blogs.cisco.com, Cisco Blog, Borderless Networks, Mar. 2011, 3 pages.

Kent, et al., "Security Architecture for the Internet Protocol", Network Working Group, Request for Comments 2401, The Internet Society, Nov. 1998, 67 pages.

Kent, et al., "IP Encapsulating Security Payload (ESP)", Network Working Group, Request for Comments 4303, The Internet Society, Dec. 2005, 45 pages.

\* cited by examiner

MANAGING TRACE REQUESTS OVER TUNNELED LINKS

TECHNICAL FIELD

The present disclosure relates generally to computer networks, and, more particularly, to trace requests and tunneled links.

BACKGROUND

Traditional methods of monitoring network performance include various tools (e.g., performance monitors, trace techniques, operations administration maintenance OAM protocols, discovery protocols, etc.) that enable the path discovery and real-time monitoring of time sensitive applications through a computer network, such as for voice and video. However, tunneling protocols, which encapsulate network traffic between end-points of a tunnel (e.g., virtual private network (VPN) tunnels), typically prevent monitoring performance on intermediate nodes along the tunnel since the tunnel (and optionally its encryption properties) essentially hides the traffic, thereby making data or media flows invisible for intermediate nodes. That is, data enters the tunnel from a head-end node, and travels through the tunnel until it arrives at a tail-end node. The traffic passes along intermediate nodes within the tunnel and is typically hidden from monitoring due to the nature of tunnels (e.g., VPNs). In this fashion, tunnels generally limit the ability of performance tools to expose and monitor traffic (e.g., particularly media calls and flows) over intermediate nodes.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 3 illustrates tunnel within the network of FIG. 1 and data flow there-through;

DESCRIPTION OF EXAMPLE EMBODIMENTS

Overview

According to one or more embodiments of the disclosure, a head-end node of a tunnel, relative to a tail-end node, receives a trace request, and in response, generates an out-of-tunnel trace request based on the trace-request. The trace request is transmitted in-tunnel to the tail-end node, while also transmitting the out-of-tunnel trace request to at least one subsequent node. The head-end node may then receive a trace response from the tail-end node based on the in-tunnel trace request, as well as a trace response from each of the subsequent nodes based on the out-of-tunnel trace request. Notably, in an illustrative embodiment, the out-of-tunnel trace request causes each subsequent node along a path of the tunnel generate and transmit a respective trace response to the head-end node, and transmit the out-of-tunnel trace request to any additional subsequent node along the path of the tunnel until the out-of-tunnel trace request reaches the tail-end node.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others.

Figure 1:
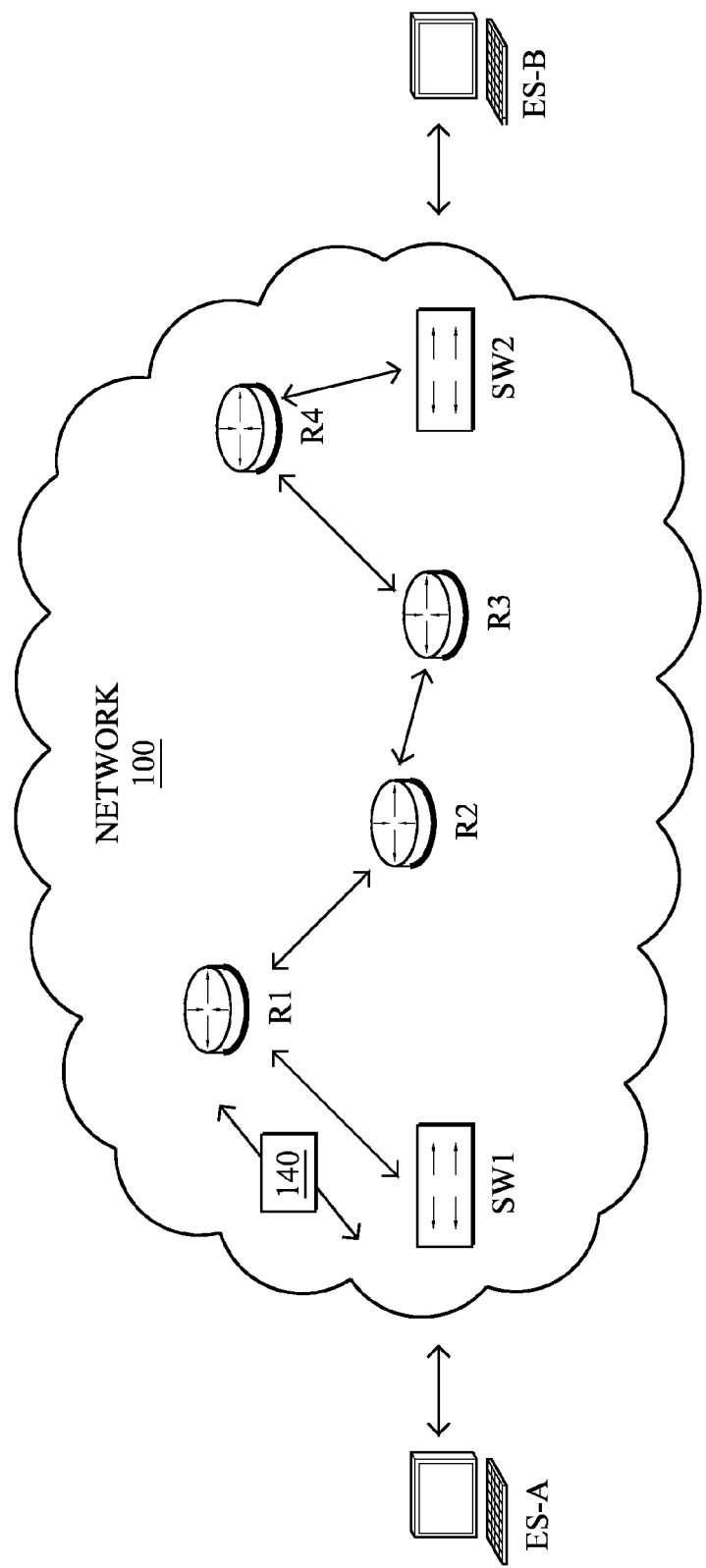
FIG. 1 illustrates an example communication network.

FIG. 1 is a schematic block diagram of an example computer network 100 illustratively comprising nodes/devices (e.g., switches or "SW" and routers or "R") interconnected by various methods of communication. For example, the links may be wired links or shared media (e.g., wireless links, etc.) where certain nodes may be in communication with other nodes, e.g., based on physical connectivity, distance, signal strength, current operational status, location, etc. These nodes can include devices such as switches, routers, servers, edge devices (e.g., provider edge or "PE" devices as well as customer edge or "CE" devices), computers, etc. Moreover, each of the devices can communicate packets (or frames) 140 with other devices using predefined network communication protocols as will be appreciated by those skilled in the art, such as various wired protocols and wireless protocols etc., where appropriate. In this context, a protocol consists of a set of rules defining how the nodes interact with each other. In addition, two devices (e.g. end station A (ES-A), and end station B (ES-B)), also communicate with devices within network 100, such as computer, internet phones, etc., (e.g., for voice or video over Internet Protocol, or VoIP). Those skilled in the art will understand that any number of nodes, devices, links, etc. may be used in the computer network, and that the view shown herein is for simplicity. Also, those skilled in the art will further understand that while the network is shown in a certain orientation, network 100 is merely an example illustration that is not meant to limit the disclosure.

Figure 2:
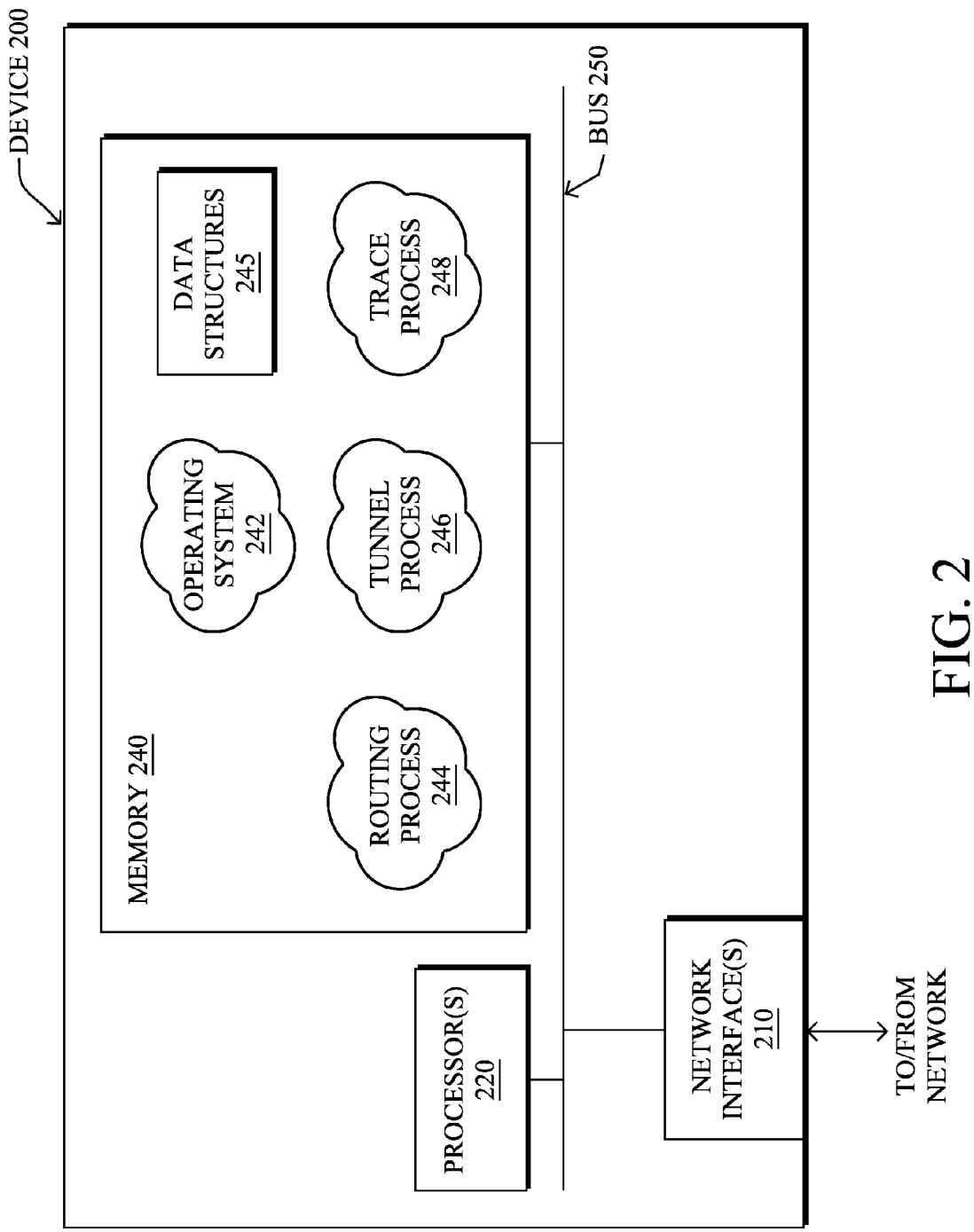
FIG. 2 illustrates an example network device/node.

FIG. 2 is a schematic block diagram of an example node/device 200 that may be used with one or more embodiments described herein, e.g., as any of the nodes such as a switch (SW) or a router (R) shown in FIG. 1 above. Device 200 may comprise one or more network interfaces 210 (e.g., wired, wireless, etc.), at least one processor 220, and a memory 240 interconnected by a system bus 250.

The network interface(s) 210 comprise the mechanical, electrical, and signaling circuitry for communicating data over network 100. Network interfaces 210 may be configured to transmit and/or receive data using a variety of different communication protocols. Note that each device may include one or more different types of network connections 210, e.g., wireless and wired/physical connections, and that the view herein is merely for illustration.

Memory 240 comprises a plurality of storage locations that are addressable by the processor 220 and the network interfaces 210 for storing software programs and data structures associated with the embodiments described herein. Processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a tunnel process 246, and an illustrative trace process 248, as described herein. Note that while processes 244, 246, and 248 are shown in centralized memory 240, additional embodiments provide for one or more of the processes to be specifically operated within the network interfaces 210.

Routing process 244 may comprise computer executable instructions executed by the processor 220 to perform functions provided by one or more routing protocols, such as Interior Gateway Protocol (IGP) (e.g., Open Shortest Path First, (OSPF), and Intermediate-System-to-Intermediate-System, (IS-IS)), the Border Gateway Protocol (BGP), Internet Protocol (IP), etc.), as will be understood by those skilled in the art. These functions may, on capable devices, be configured to manage a routing/forwarding table (e.g., a data structure 245) containing, e.g., data used to make routing/forwarding decisions. For example, routing connectivity can be discovered and known prior to computing routes to any destination in the network (e.g., link state routing such as Open Shortest Path First (OSPF), Optimized Link State Routing (OLSR), etc.). Notably, routing services 244 may also perform functions related to virtual routing protocols, such as maintaining virtual routing and forwarding (VRF) instances (not shown).

Tunnel process 246, generally provide services to configure and/or maintain one or more network tunnels, which are a logical structure that generally encapsulate a packet (a header and payload) of one protocol inside a data field of another protocol packet with a new header. For instance, in this manner, the encapsulated data may be transmitted through networks that it would otherwise not be capable of traversing. Notably, a tunnel creates a transparent virtual network link, such as for a virtual private network (VPN) link, between two network nodes and is generally unaffected by physical network links or devices (i.e., the physical network links or devices merely forward the encapsulated packet based on the new header). For example, a VPN tunnel can be created by tunnel process 246 to ensure a secure network link between devices over a public telecommunication infrastructure, e.g., the Internet. Tunnels can be established through various known protocols such as VPN protocols, point-to-point tunneling protocol (PPTP), multiprotocol label switching label switched path (MPLS LSP), generic route encapsulation (GRE), Internet Protocol Security (IPSec), Layer-2 Tunnel Protocol (L2TP), Internet Protocol tunnels and other known tunneling methods.

Trace process 248 generally provides techniques for path discovery, diagnostic monitoring and analyzing performance parameters and metrics such as traffic and path statistics (e.g., Quality of Service (QoS)). Trace process 248 can include services relating to known protocols such as ping, traceroute, mediatrace, etc., as described herein, augmented according to the techniques herein. For example, trace process 248 can discover a path and/or measure transit delay of packets across networks (e.g., IP networks) via trace requests and trace responses. A trace request can be sent to a destination node via intermediate nodes, and the trace request, when received by intermediate nodes, can cause the intermediate nodes to generate and transmit a trace response. The trace responses can be transmitted directly to a device initiating the trace request, or, in some embodiments, the trace responses can be aggregated by one or more of the nodes prior to subsequent transmission. Notably, the trace responses can further provide one or more performance measurements included by the responding devices, which may be analyzed by the trace process 248, accordingly.

Each of the techniques described herein may be performed by hardware, software, and/or firmware, such as in accordance with processes 244, 246, and 248, which may contain computer executable instructions executed by the processor 220 (or independent processor of interfaces 210). In addition, while processes 244, 246, and 248 are shown as installed in a memory 240, and therefore being implemented in software, these processes could be implemented in any of hardware (e.g., electronic circuitry), firmware, software, or a combination thereof. Alternatively, these processes may be configured on a storage medium for subsequent loading into memory 240. The storage medium can include a computer-readable medium encoded with a computer program, and can be any conventional storage medium that stores the processes thereon in tangible form. Examples of storage media include a floppy disk, a compact disk, a magnetic tape, a read only memory, an optical storage media, universal serial bus (USB) flash drive, etc. Alternatively, storage media can include a random access memory, or other type of electronic storage, located on a remote storage system and coupled to processor 220, via network interface 210.

As will be apparent to those skilled in the art other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
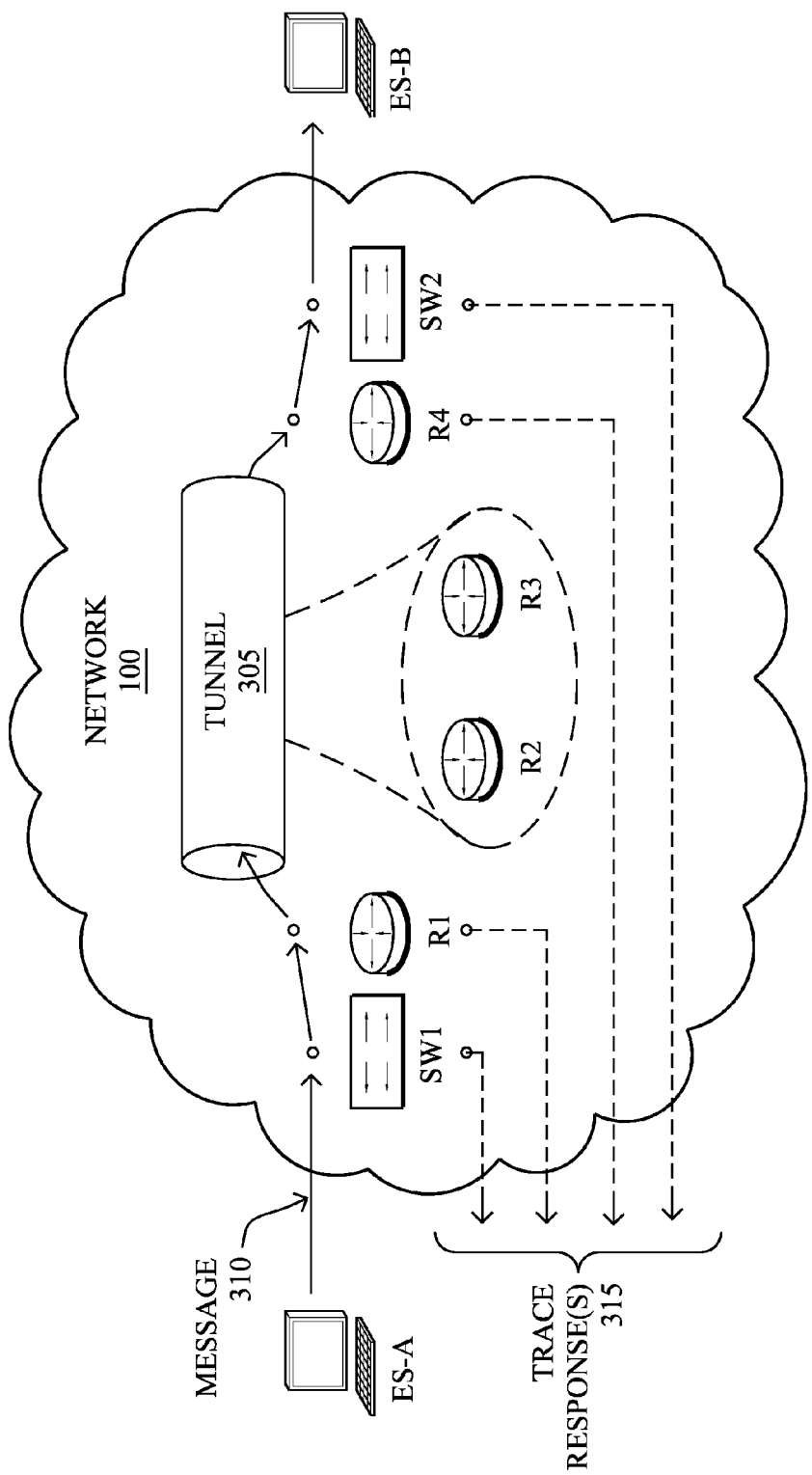

FIG. 3 is an example schematic block diagram of an example tunnel 305 (e.g., a VPN tunnel) and data flow therethrough within the communication network 100 of FIG. 1. For example, ES-A can originate and send a message 310 (e.g., packet 140) through network 100 to ES-B, such as a data packet (e.g., media data) or trace request, as shown below. Illustratively, message 310 may be forwarded by SW1 to R1, which, as a head-end node of tunnel 305, inserts (encapsulates) the message 310 into the tunnel (e.g., established by tunnel process 246), and the message traverses the tunnel (e.g., via R2 and R3) to the tail-end node R4. R4 receives the message 310, and may then forward the message on to SW2 to reach the destination, ES-B. (Note that various tunneling protocols may use penultimate hop popping, in which R3 removes the tunnel encapsulation prior to forwarding to the tail-end node R4.) Those skilled in art will appreciate that the view shown in FIG. 3 is merely for illustration and is not to be construed to limit the present disclosure. For example, those skilled in the art will appreciate that a tunnel can comprise any number and arrangement of nodes.

As noted above, traditional methods of monitoring network performance include various tools that enable the path discovery and real-time monitoring of the time sensitive applications such as voice and video. Examples of such protocols comprise media-based performance monitors (e.g., a "media trace" message protocol), Internet Control Message Protocol (ICMP) traceroute, multi-protocol label switching (MPLS) operations administration maintenance (OAM), Ethernet-OAM (E-OAM), discovery protocols, etc. Such tools allow for the analysis of traffic, as well as comparison against service level agreements (SLAs) and generation of performance statistics.

However, as discussed above, tunnels typically prevent intermediate node monitoring, since the tunnel (including encryption properties) essentially hides traffic thereby making data or media flow invisible for intermediate nodes. In this fashion, tunnels (e.g., VPNs) limit the ability of performance tools to expose and monitor traffic over intermediate nodes, thus limiting the tools effectiveness.

As an illustrative example, the known connection control signaling protocol "Q.931" (ITU-T Recommendation Q.931) provides conventional signaling for Integrated Services Digital Network (ISDN) communications applications, and facilitates setup and termination of connections. In conventional Q.931 networks, a call can be traced end-to-end, and quality of service parameters for the voice call can be determined. However, with the transition from time division multiplexing (TDM) or ISDN (or others, such as T1, primary rate interface (PRI), etc.) to voice over Internet Protocol (VoIP) functionality, the ability to trace or monitor call details in real-time has diminished. In particular, with the onset of various tunneling protocols (e.g., VPNs), traditional call signaling protocols (e.g., session initiation protocols (SIP)) and network terminal control protocols can no longer provide end-to-end tracing functionality, real-time call monitoring, or quality of service (QoS) parameters determinations, such as the quality of a call, flow of network statistics, jitter, packet drops, latency, etc.

Referring still to FIG. 3, assume that the message 310 is forwarded through network 100 as a type of "trace request", such as a media trace request (an application-layer trace request), a traceroute (a time-to-live or TTL-based ping request), etc., each node/device along the path of the trace request receives the message and generates and transmits a "trace response" 315 to the trace initiating device, e.g., namely ES-A. However, as mentioned above, when trace request message 310 is forwarded via R2 and R3 while within the tunnel 305 as shown, no trace response is generated, but, instead, message 310 is merely forwarded on to R4 since the nodes within tunnel 305 are unaware of any encapsulated trace requests. Moreover, even if a various monitoring is enabled and capable of examining real-time transport (RTP) network traffic over tunnels/VPN networks, the monitoring will not monitor intermediate nodes since the Internet Protocol address of the requestor will be encrypted and protected within the tunnel 305. Thus, there will be no discovery and no network performance measurements of R2 and R3.

Accordingly, the techniques described herein provide for performance monitoring of intermediate nodes along tunnels (e.g., within secured networks using VPN tunnels). In particular, in one or more specific embodiments, the techniques illustratively provide for a splitting (forking) a trace request at a head-end node of a tunnel, and sending two traces. The first trace is an in-tunnel trace request, which is sent within the tunnel (e.g., encapsulated) to a tail-end node and the second additional trace is an out-of-tunnel trace request (e.g., IP routed or un-encapsulated), which is sent to subsequent nodes along the path of the tunnel. Since the out-of-tunnel trace request is transmitted to each subsequent node along the path of the tunnel without being inserted into the tunnel, it causes the subsequent nodes to generate trace responses. In this fashion, path discovery and statistics gathered by subsequent intermediate or transit nodes (and any node after the tunnel toward the final destination via the in-tunnel requests and responses) may be relayed to the head-end node (e.g., acting as a trace proxy) and forwarded (e.g., aggregated in certain embodiments) to the original trace initiator.

Illustratively, the techniques described herein may be performed by hardware, software, and/or firmware, such as in accordance with trace process 248, which, in conjunction with tunnel process 246 (e.g., and routing process 244) may comprise computer executable instructions executed by processor 220 to perform functions relating to the techniques described herein. For example, the techniques herein may be treated as extensions to conventional trace protocols, such as the various media trace protocols, traceroute protocols, etc., and as such, may be processed by similar components understood in the art that execute those protocols, accordingly.

Figure 4:
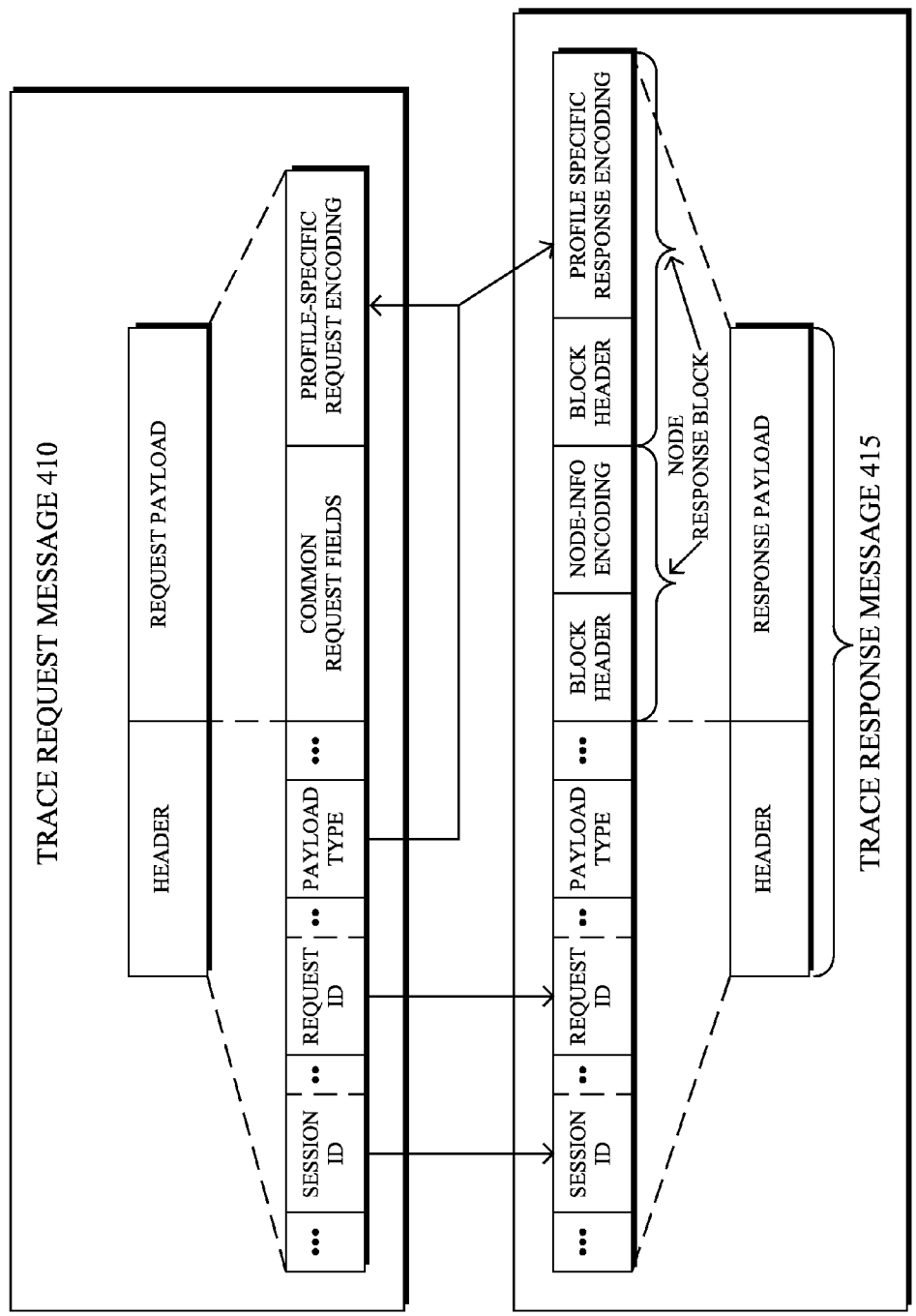
FIG. 4 illustrates an example trace request message and a trace response message.

FIG. 4 illustrates an example trace request message 410 and a trace response message 415. Messages 410 and 415 can be, for example, mediatrace messages, time-to-live (TTL)-based trace requests (e.g., traceroute), etc., and correspond to messages 310 and 315 of FIG. 3, respectively. In addition, both messages 410 and 415 include a header followed by a payload. Trace request message 410 can be generated (e.g., constructed) by a trace initiator (e.g., ES-A of FIG. 3). As shown, trace request message 410 includes a header (e.g., an initiator version, session, request identification, and payload type/profile type, etc.), common request fields (e.g., initiator node information, common request settings, etc.), and profile specific encoding (e.g., metrics to be monitored, etc.). As discussed above, the trace request can cause a receiving device (e.g. a subsequent node) to generate and transmit a trace response message 415 which may comprise the monitoring and statistical collection called for in the trace request 410 (or, simply, a TTL error message). In particular, trace response message 415 comprises a header (e.g., responder version, session, and request information) and a response payload that may comprise node information response blocks (e.g., responder node information and encoded statistics for the metrics signaled in the corresponding request message). Although FIG. 4 illustrates a mediatrace request and a mediatrace response, those skilled in the art will appreciate that various types of trace requests and trace responses can be used with the techniques described herein, and without departing from the spirit and scope of the present disclosure. For instance, those skilled in the art will appreciate that a traceroute request and response may have less information, such as simply a standard ICMP ping and TTL error message, respectively.

Figure 5:
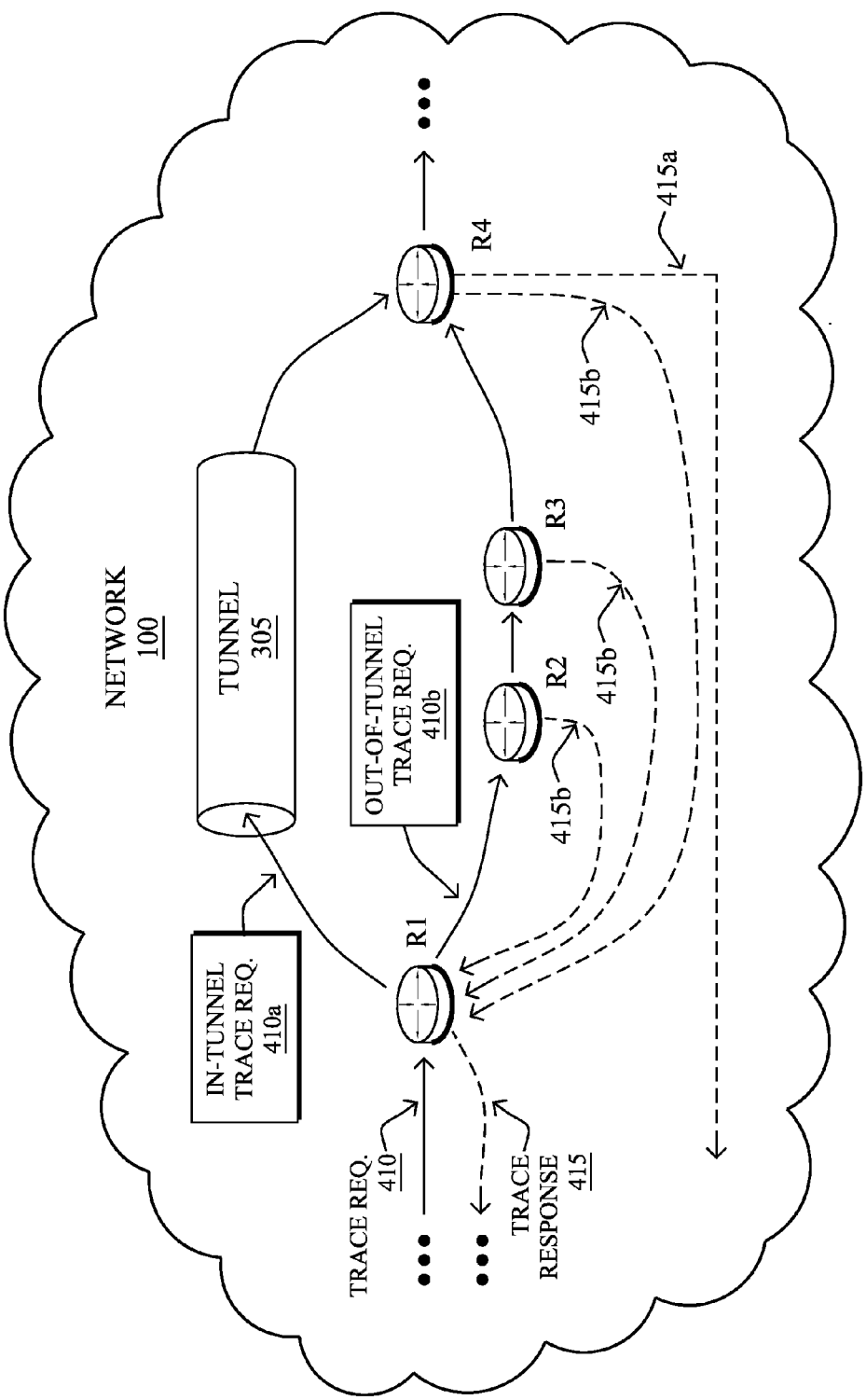
FIG. 5 illustrates an example view of devices executing techniques in accordance with embodiments described herein.

Operationally, and with reference to FIG. 5, the techniques herein "fork" a trace request 410 received at the head-end node of the tunnel (e.g., R1 of tunnel 305). The traditional received request will continue to follow the path via the tunnel as "in-tunnel trace request" 410a, e.g., providing encapsulation fields to the header of the message (e.g., labels, tags, or other tunnel headers). However, in accordance with the techniques herein, the forked trace request is generated by the head-end node as an "out-of-tunnel trace request" 410b toward the tunnel tail-end node R4 (e.g., without being encapsulated into the tunnel). As shown in FIG. 5, this out-of-tunnel trace request may be used to perform discovery of the subsequent nodes along the tunnel path (e.g., R2 and R3) as well as gather performance information (e.g., Quality of Service (QoS) parameters). For instance, as explained below, such performance information may be gathered through an analysis of an IPsec "ESP" header.

In detail, in the example as shown in FIG. 5, assume that ES-A (trace initiator) has generated a trace request 410 to ES-B, as in FIG. 3 above, where SW1 (trace responder) has received the trace request and responded in kind to ES-A. In FIG. 5, however, once R1 receives the trace request 410, R1 may now be configured to operate as a trace responder, a trace initiator, and a trace proxy. In particular, R1 may send a trace response 415 to ES-A, forwards the original trace request 410a over the tunnel, and also generates the out-of-tunnel trace request 410b for the tunnel tail-end node (R4) without using the tunnel (e.g., IP routed toward R4). In this manner, subsequent nodes R2 and R3 both receive the out-of-tunnel trace request 410b, and respond with generated trace responses 415b to R1.

R4 may eventually receive both the in-tunnel trace request 410a as well as the out-of-tunnel trace request 410b, and may respond to each independently (e.g., the response 415a to ES-A for in-tunnel trace request 410a, and response 415b to R1 for the out-of-tunnel trace request 410b). Note that SW2 and ES-B may each also receive the original in-tunnel trace request 410, and may respond to ES-A, accordingly (responses 415a).

R1 may forward any trace responses 415a (from the in-tunnel trace request 410a) to ES-A, and may add identifiers for the tunnel head-end node (R1) and tail-end node (R4), accordingly. In addition, R1 receives the trace responses 415b (from the out-of-tunnel trace request 410b) and may relay them toward the original requestor ES-A. In particular, as noted above, the forked trace request to the tunnel forwarding nodes (subsequent intermediate nodes) is illustratively a conventional trace message (media trace or traceroute) with the initiator and source as the tunnel head-end node and the destination as the tunnel tail-end node. As such, the trace responders send their responses to the tunnel head-end node R1. R1 may then either relay the responses individually to ES-A (if configured to interpret the additional responses), or illustratively, may merge and forward the responses 415b to the original trace initiator (e.g., ES-A) with additional information regarding the fork, as well as the tunnel head-end and tail-end nodes. This additional context provides a way for a resultant trace report to allow correlation of the in-tunnel and out-of-tunnel paths. In other words, the head-end node can aggregate each of the trace responses (e.g., aggregate the in-tunnel trace response and the out-of-tunnel trace response(s)) into a single response, or aggregate only the out-of-tunnel trace response(s) into a single response, and transmit the aggregated response to a trace request originator.

Figure 6:
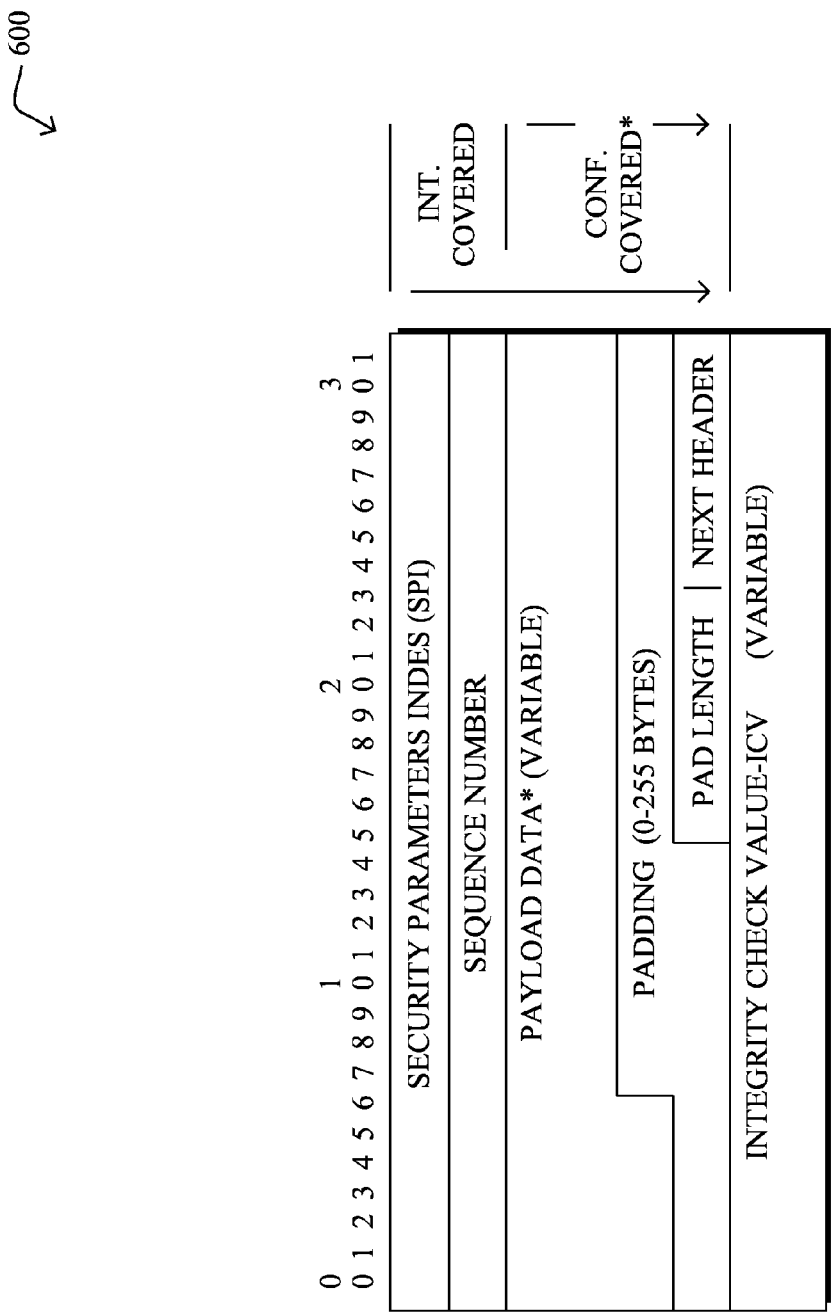
FIG. 6 illustrates an encapsulating security payload (ESP) packet.

In accordance with one or more specific embodiments as mentioned above, the head-end node R1 may also obtain performance information via trace responses through an IPsec encapsulating security payload (ESP) header from an IPsec node. For example, packet loss detection can be determined from an IPSec ESP header of an ESP packet as shown in FIG. 6, which typically includes an ESP Sequence number field that can increment on a per-packet basis for an established security association (e.g., security parameters index or "SPI") between the IPsec nodes (e.g., between nodes R1, R2, R3, and R4). In this fashion, the SPI and Sequence Number field can be the basis of packet analysis by intermediate nodes.

Notably, an analysis of the VPN tunnel forwarding nodes is on the tunnel itself and is not performed on the specific media as is the case with traditional media trace. However, fault isolation can still be performed since the packet loss for a specific flow may be indicated by an IPsec loss. Additionally, as the data or traffic is analyzed post-VPN tunnel (e.g., at SW2 and R4), the validity of the fault itself can be determined.

Figure 7:
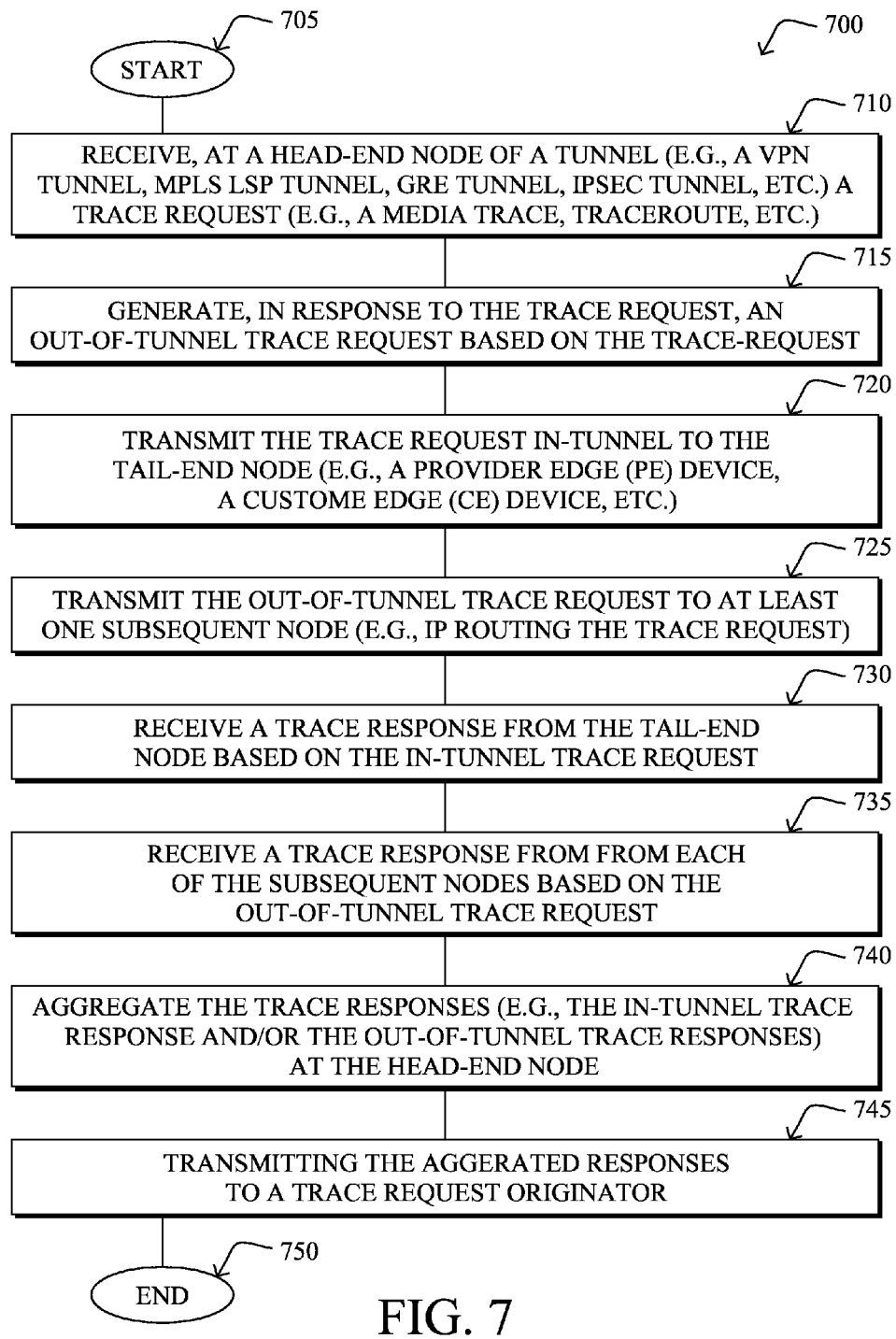
FIG. 7 illustrates an example simplified procedure for performance monitoring over a tunnel.

FIG. 7 illustrates an example simplified procedure 700 for performance monitoring over a tunnel in accordance with one or more embodiments described herein. The procedure 700 may start at step 705, and continues to step 710, where, as described in greater detail above, a head-end node of a tunnel (e.g., a VPN tunnel, a MPLS LSP, a GRE tunnel, a IP tunnel, etc.), relative to a tail-end node, receives a trace request (e.g., a media trace request, a time-to-live (TTL) trace request, etc.). In step 715, the head-end node, in response to the trace request, generates an out-of-tunnel trace request. Next, in step 720, the head-end node transmits the trace request in-tunnel to the tail-end node (e.g., a provider/customer edge device). The head end node may then transmit the out-of-tunnel trace request to at least one subsequent node, e.g., via IP routing, in step 725. Accordingly, in step 730, the head-end node receives a trace response from the tail-end node based on the in-tunnel trace request. In step 735, the head-end node receives a trace response (e.g., QoS) from each of the subsequent nodes based on the out-of-tunnel trace request. Note that as described above, the head-end node can aggregate the trace responses in step 740, if so configured. For example, the head-end node can aggregate the in-tunnel trace responses, the out-of-tunnel trace responses, or a combination thereof. In step, 745, the head-end node transmits the aggregated response(s) to a trace request initiator. The procedure 700 may subsequently end in step 750, or may restart at step 705 to receive further messages.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for performance monitoring of individual intermediate nodes within tunnels. In particular, the techniques may be used for analyzing media paths (e.g., VoIP calls) over virtual private network links (e.g., VPN tunnels). For instance, the techniques herein expand current tracing capabilities beyond Enterprise Networks to include VPN networks, and provide performance monitoring in an end-to-end solution over secured networks (e.g., SSL, IPSec, L2PN, etc.). In addition, the techniques efficiently expand trace techniques without injecting additional traffic and, thus, do not impact the security or performance of intermediate nodes.

While there have been shown and described illustrative embodiments that provide for performance monitoring of intermediate nodes within tunnels, it is to be understood that various other adaptations and modifications may be made within the spirit and scope of the embodiments herein. For example, the embodiments have been shown and described herein with relation to VPN tunnels, and particularly to a media-trace architecture. However, various other embodiments in their broader sense are not as limited, and may, in fact, be used with other types of tunnels and/or network architectures (e.g., secured or unsecured). Also, while the techniques generally describe initiation and determinations by a head-end node (R1), such initiation and determination can be determined by various other nodes within the network aware of subsequent tunnels within a traced path toward an endpoint. Additionally, it should be noted that no specific mention of trace protocol transport has been presented herein (e.g., resource reservation protocol (RSVP) versus other protocols more readily "usable" over the Internet), and the techniques herein may be used with any suitable transport protocol according to the underlying network architecture within which the techniques are applied. Note also that although the illustrative trace process 248 is shown as a single process capable of tracing and analyzing, those skilled in the art will appreciate that a device may only be capable of tracing, or may have separate processes for tracing and analyzing, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a head-end node of a tunnel relative to a tail-end node, a trace request;
   generating, in response to the trace request, an out-of-tunnel trace request based on the trace-request;
   transmitting the trace request in-tunnel to the tail-end node;
   transmitting the out-of-tunnel trace request to at least one subsequent node;
   receiving a trace response from the tail-end node based on the in-tunnel trace request; and
   receiving a trace response from each of the subsequent nodes based on the out-of-tunnel trace request.

2. The method of claim 1, wherein the out-of-tunnel and the in-tunnel trace requests are at least one of a media trace request, or a time to live (TTL)-based trace request.

3. The method of claim 1, wherein the out-of-tunnel trace response and the in-tunnel trace response comprise one or more performance measurements.

4. The method of claim 1, wherein the out-of-tunnel trace request causes each subsequent node along a path of the tunnel to i) generate and transmit a respective trace response to the head-end node, and ii) transmit the out-of-tunnel trace request to any additional subsequent node along the path of the tunnel until the out-of-tunnel trace request reaches the tail-end node.

5. The method of claim 1, wherein the trace response from the tail-end node is an in-tunnel trace response and the trace response from each of the subsequent nodes are out-of-tunnel trace responses, the method further comprising:
   aggregating each of the out-of-tunnel trace responses at the head-end node; and
   transmitting the in-tunnel trace response and the aggregated out-of-tunnel responses to a trace request originator.

6. The method of claim 1, wherein the trace response from the tail-end node based on the in-tunnel trace request is an in-tunnel trace response and the trace response from each of the subsequent nodes based on the out-of-tunnel trace request are out-of-tunnel trace responses, the method further comprising:
   aggregating the in-tunnel trace response and each of the out-of-tunnel trace responses into a single response at the head-end node; and
   transmitting the single response to a trace request originator.

7. The method of claim 1, wherein the out-of-tunnel trace request is Internet Protocol (IP) routed to the at least one subsequent node.

8. The method of claim 1, wherein the tunnel is one of a virtual private network (VPN) tunnel, a multiprotocol label switching label switched path (MPLS LSP), a generic route encapsulation (GRE) tunnel, an Internet Protocol Security (IPSec) tunnel, or a layer-2 tunneling protocol (L2TP) tunnel.

9. The method of claim 1, wherein the head-end node is at least one of a provider edge (PE) device or a customer edge (CE) device.

10. An apparatus, comprising:
    one or more network interfaces adapted to communicate in a computer network;
    a processor coupled to the network interfaces and adapted to execute one or more processes; and
    a memory configured to store a process executable by the processor, the process when executed operable to:
    receive, at a head-end node of a tunnel to a tail-end node, a trace request;
    generate, in response to the trace request, an out-of-tunnel trace request based on the trace-request;
    transmit the trace request in-tunnel to the tail-end node;
    transmit the out-of-tunnel trace request to at least one subsequent node;
    receive a trace response from the tail-end node based on the in-tunnel trace request; and
    receive a trace response from each of the subsequent nodes based on the out-of-tunnel trace request.

11. The apparatus of claim 10, wherein the out-of-tunnel and the in-tunnel trace requests are at least one of a media trace request, or a time to live (TTL)-based trace request.

12. The apparatus of claim 10, wherein the out-of-tunnel trace response and the in-tunnel trace response comprise one or more performance measurements.

13. The apparatus of claim 10, wherein the out-of-tunnel trace request causes each subsequent node along a path of the tunnel to i) generate and transmit a respective trace response to the head-end node, and ii) transmit the out-of-tunnel trace request to any additional subsequent node along the path of the tunnel until the out-of-tunnel trace request reaches the tail-end node.

14. The apparatus of claim 10, wherein the trace response from the tail-end node based on the in-tunnel trace request is an in-tunnel trace request and the trace response from each of the subsequent nodes based on the out-of-tunnel trace request are out-of-tunnel trace responses, the process when executed is further operable to:
    aggregate each of the out-of-tunnel trace responses at the head-end node; and
    transmit the in-tunnel trace response and the aggregated out-of-tunnel responses to a trace request originator.

15. The apparatus of claim 10, wherein the trace response from the tail-end node based on the in-tunnel trace request is an in-tunnel trace response and the trace response from each of the subsequent nodes based on the out-of-tunnel trace request are out-of-tunnel trace responses, the process when executed is further operable to:
    aggregate the in-tunnel trace response and each of the out-of-tunnel trace responses into a single response at the head-end node; and
    transmit the single response to a trace request originator.

16. The apparatus of claim 10, wherein the out-of-tunnel trace request is Internet Protocol (IP) routed to at least one subsequent node.

17. The apparatus of claim 10, wherein the tunnel is one of a virtual private network (VPN) tunnel, a multiprotocol label switching label switched path (MPLS LSP), a generic route encapsulation (GRE) tunnel, an Internet Protocol Security (IPSec) tunnel, or a layer-2 tunneling protocol (L2TP) tunnel.

18. A tangible, non-transitory, computer-readable media having software encoded thereon, the software, when executed by a processor, operable to:
   receive, at a head-end node of a tunnel to a tail-end node, a trace request;
   generate, in response to the trace request, an out-of-tunnel trace request based on the trace-request;
   transmit the trace request in-tunnel to the tail-end node;
   transmit the out-of-tunnel trace request to at least one subsequent node;
   receive a trace response from the tail-end node based on the in-tunnel trace request; and
   receive a trace response from each of the subsequent nodes based on the out-of-tunnel trace request.

19. The computer-readable medium of claim 18, wherein the out-of-tunnel and the in-tunnel trace requests are at least one of a media trace request, or a time to live (TTL)-based trace request.

20. The computer-readable medium of claim 18, wherein the trace response from the tail-end node is an in-tunnel trace response and the trace response from each of the subsequent nodes are out-of-tunnel trace responses, the software, when executed, further operable to:
   aggregate each of the out-of-tunnel trace responses at the head-end node; and
   transmit the in-tunnel trace response and the aggregated out-of-tunnel responses to a trace request originator.

* * * * *